United States Patent [19]
Tanaka et al.

[11] Patent Number: 4,799,122
[45] Date of Patent: Jan. 17, 1989

[54] MOUNTING A DISC RECEIVER IN A DISC CARTRIDGE

[75] Inventors: Kimio Tanaka; Haruo Shiba, both of Nagano, Japan

[73] Assignee: TDK Corporation, Japan

[21] Appl. No.: 10,896

[22] Filed: Feb. 4, 1987

[30] Foreign Application Priority Data

Feb. 10, 1986 [JP] Japan .............................. 61-16790[U]

[51] Int. Cl.⁴ .............................................. G11B 23/03
[52] U.S. Cl. ..................................... 360/133; 369/271
[58] Field of Search ................. 360/133, 132; 369/291

[56] References Cited

U.S. PATENT DOCUMENTS

| 3,416,150 | 12/1968 | Lindberg | 360/133 |
| 3,529,301 | 9/1970 | Hiruta | 360/133 |
| 4,692,831 | 9/1987 | Suzuki | 360/133 |

FOREIGN PATENT DOCUMENTS 0137965  4/1985  European Pat. Off. ............ 360/133

Primary Examiner—Robert S. Tupper
Attorney, Agent, or Firm—Steinberg & Raskin

[57] ABSTRACT

A disc cartridge capable for ensuring smooth movement of a disc receiver for a long period of time with high reliability. The disc cartridge includes a pivot pin on which a disc receiver is supported so as to be pivotally movable about the pivot pin and which is mounted on a lower inner surface of a casing to inwardly project therefrom. The pivot pin cooperates with a bearing mounted on an upper inner surface of the casing to constantly form a gap in a thickness direction of the casing in the casing which has a distance sufficient to ensure smooth pivotal movement of the disc receiver about the pivot pin in the casing.

11 Claims, 4 Drawing Sheets

MOUNTING A DISC RECEIVER IN A DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in a recording and/or reproducing equipment such as a disc player.

Conventionally, it has been desirable to protect such a disc type recording carrier from environment because it is not only readily covered with dust and damaged but adversely affected due to a variation in temperature. For this purpose, the use of an envelope such as a tray, a casing or the like has been proposed to protect the disc. Unfortunately, such a conventional envelope is not effective to protect a double-sided hard disc, because the housing of the disc in a storage space defined in the envelope causes the disc, particularly, a recording surface section of the disc to be contacted by an inner surface of the envelope. Such contacting also takes place during storage or transportation of the envelope. Thus, the use of the envelope still results in damage and/or pollution of the disc as well as the exposure of the disc to a variation in temperature.

Also, an envelope in which a hard disc is housed has a sliding member such as a shutter or the like mounted thereon and must be provided therein with an internal space sufficient to receive the hard disc therein, so that a wall thickness of the envelope is substantially decreased to a degree sufficient to deteriorate its rigidity. This often results in the sliding member failing to exhibit its satisfactory function. In particular, the envelope is often distorted or deformed due to external force applied thereto, pressing or the like, so that the internal space of the envelope is reduced to cause function of the sliding member to be deteriorated and a disc receiver to fail in pivotal movement. Further, the distortion and/or deformation of the envelope causes the disc to be contacted with an inner surface of the envelope to deteriorate its function.

Accordingly, it would be highly desirable to provide a disc cartridge which is capable of positively ensuring smooth movement of a sliding member and a disc receiver irrespective of distortion and/or deformation of a casing due to external force, pressing or the like, as well as safely housing a disc in the casing without contacting the casing.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. Also, the disc cartridge includes a shutter arranged to operate at least a window provided at the casing to insert a disc driving element of a disc player therethrough into the disc cartridge. The casing is provided therein with a pair of actuators each of which is adapted to releasably lock the shutter. The disc cartridge also includes a disc receiver which is arranged in the casing and operatively connected to each o the actuators to selectively receive therein a part of a peripheral portion of the disc. The actuator is arranged to be slidable in a longitudinal direction of the disc cartridge to cause the disc receiver to be approachably moved with respect to the disc. The disc cartridge also includes a pivot pin on which the disc receiver is supported so as to be pivotally movable about the pivot pin and which is mounted on one of inner surfaces of the casing opposite to each other to inwardly project therefrom. The pivot pin cooperates with the other of the inner surfaces to constantly form a gap in a thickness direction of the casing in the casing which has a distance sufficient to ensure smooth movement of the disc receiver.

Accordingly, it is an object of the present invention to provide a disc cartridge which is capable of carrying out its smooth operation for a long period of time with high reliability.

It is another object of the present invention to provide a disc cartridge which is capable of safely housing a disc in a casing to cause it to exhibit its satisfactory performance for a long period of time without adversely affecting a recording surface section of the disc.

It is a further object of the present invention to provide a disc cartridge which is capable of effectively exhibiting its satisfactory operation irrespective of distortion and deformation of a casing due to external force applied thereto.

It is still another object of the present invention to provide a disc cartridge which is capable of constantly ensuring smooth pivotal movement of a disc receiver irrespective of distortion and deformation of a casing.

It is yet another object of the present invention to provide a disc cartridge which is capable of ensuring smooth movement of a sliding movement.

It is still a further object of the present invention to provide a disc cartridge which is capable of accomplishing the above-noted objects with a simple structure.

Still other objects and advantages of the invention will in part be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

A disc cartridge according to the present invention will now be described hereinafter with reference to the accompanying drawings.

Figure 1:
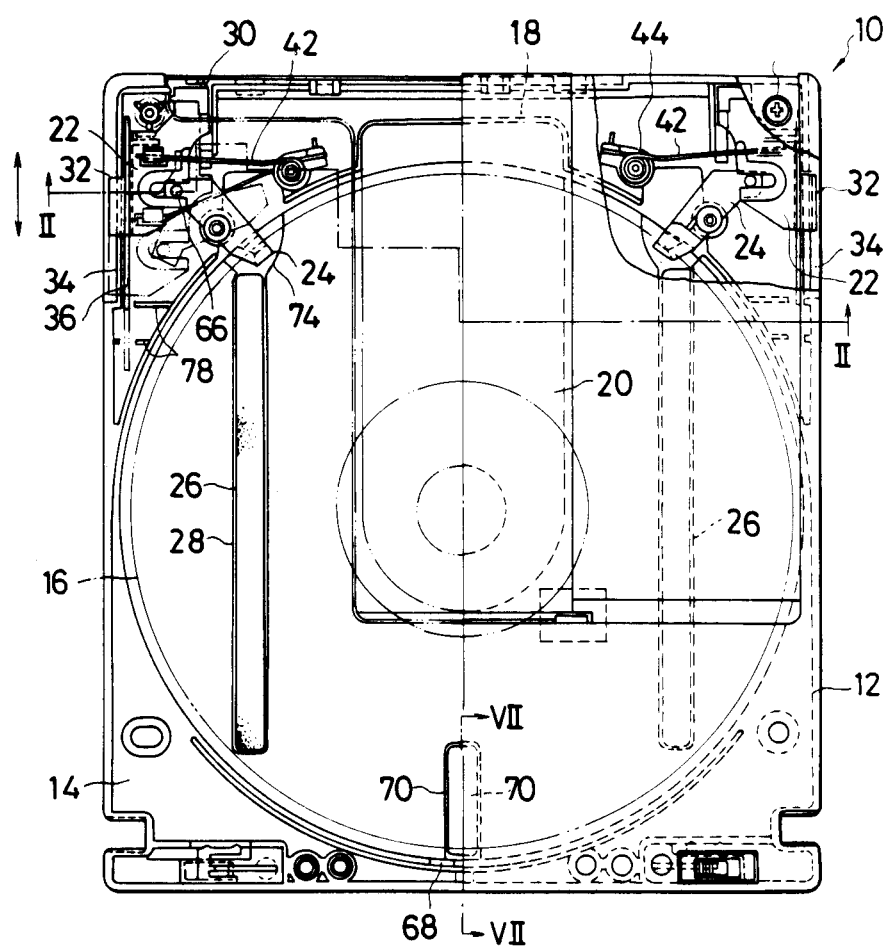
FIG. 1 is a partly cutaway plan view showing an embodiment of a disc cartridge according to the present invention.

FIG. 1 generally shows an embodiment of a disc cartridge according to the present invention.

Figure 2:
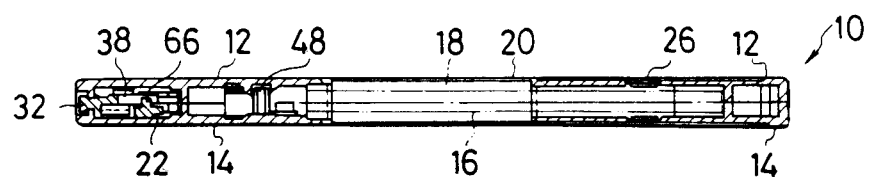
FIG. 2 is a sectional view taken along line II—II of FIG. 1.
Figure 3:
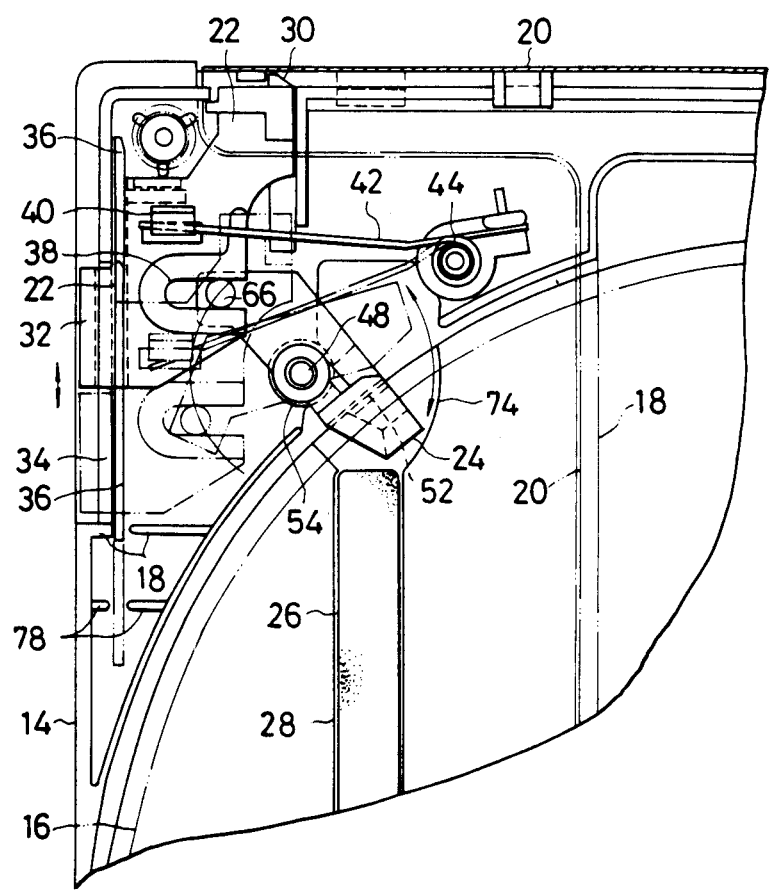
FIG. 3 is a fragmentary enlarged plan view showing an actuating section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a disc driving element of a disc player (not shown) such as a disc head therethrough into the casing 10. The window 18 is operated by a sliding member or shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive therein a part of a peripheral portion of the disc 16 or a part of each of upper, lower and peripheral end surfaces of the disc 16. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved. Therefore, so that when the shutter 20 is actuated to close the window 18, the disc receiver 24 may be engaged with the disc 16 or insert therein a part of the disc to force it toward a rear end of the casing 10 while holding it at a center of the casing 10 along a thickness direction of the casing, to thereby keep it at a state of floating in the space defined in the casing 10, whereas when the shutter 20 is actuated to open the window 18, the disc receiver 24 may be disengaged from the disc 16 to prepare the disc for engagement with the disc driving element of the disc player which is then inserted through the opened window into the cartridge.

In the disc cartridge of the illustrated embodiment, the upper cover plate 12 and lower cover plate 14 each are provided on an inner surface thereof with at least a disc holding member 26 as shown in FIG. 1, which is preferably arranged in a manner to somewhat project from the inner surface of the cover plate. The disc holding member 26 is positioned so as to be abutted against a non-recording section of the disc 16 such as a peripheral section thereof, a central section thereof or the like. In the illustrated embodiment, each of the cover plates 12 and 14 is provided with two such disc holding members 26 so as to positionally correspond to a substantially peripheral section of the disc 16 and in a substantially symmetric manner so that the disc 16 may be uniformly supported thereon. Each of the disc holding members 26 is arranged in a shallow recess 28 formed on the inner surface of the cover plate. The disc holding member 26 may be formed of at least one material selected from the group consisting of ultra-high-molecular-weight polyethylene resin, ultra-high-molecular-weight polyethylene foam, graphite polytetrafluoroethylene, polyethylene terephthalate (PET) and polybutylene terephthalate (PBT).

In the illustrated embodiment, the shutter 20 comprises a plate member of a substantially U-shape which is movably fitted on the casing 10 so as to be slidable along the upper and lower cover plates 12 and 14.

A pair of the actuators 22, as shown in FIG. 1, are formed to be symmetric and arranged adjacent to both sides of a front portion of the casing 10 in a manner to be not only opposite to each other but symmetric along a longitudinal axis of the cartridge and slidable with respect to the casing 10. Also, the actuators 22 each serve as an actuating lever to actuate operation sections of the disc cartridge. More particularly, each of the actuators 22, as shown in FIG. 3, is provided at a front end thereof with lock means 30, which comprise, in the illustrated embodiment, a hook-like member integrally formed at the front end of the actuator 22 and is securely engaged with the shutter 20. The actuator 22 is also provided on one side or an outer side thereof with actuating means 32 which comprises, in the illustrated embodiment, a projection integrally formed on the outer side of the actuator and outwardly extending through a horizontally extending cutout or slot 34 formed at a side wall of the casing 10. Also, the actuator 22 has cover means 36 integrally provided on the one side thereof so as to extend in a longitudinal direction thereof. The cover means 36 is formed to thoroughly cover the cutout 34 formed at the side wall of the casing 10 in a sealed manner to function as a dust protective cover for preventing any dust from entering the casing 10 through the cutout 34. In addition, the actuator 22 is formed on the other side or an inner side thereof with a guide groove 38 of a substantially U-shape which serves as a movement transmission means for transmitting sliding movement of the actuator to the disc receiver 24 as described hereinafter. Further, the actuator 22 is provided on an upper surface thereof with a spring bearing 40 as shown in FIG. 3 which is engaged with one end of a spring 42 held at the other end thereof on a spring holder 44 fixed on the casing 10, so that the actuator may be constantly forced toward a front end of the casing 10.

A pair of the disc receivers 24, as shown in FIG. 1, are also formed in a manner to be symmetric. Each of the disc receivers 24 is generally formed into a lever-like shape as shown in FIGS. 1 and 3 and provided at a middle thereof with an engagement or fitted portion which is fitted on a pivot pin 48 to cause the disc receiver 24 to be pivotally moved about the pivot pin 48. The disc receiver 24 is provided at one end thereof with a receiver body 46, which is formed into a substantially sideways U-shape to define therein a recess designated by reference numeral 50 in FIGS. 4 and 5. The recess 50 is provided on an end surface thereof contacted with the peripheral end portion of the disc 16 with an elastic member 52 to prevent unsteadiness and/or damage of the disc in the disc receiver 24. Such an elastic member may be arranged on upper and lower surfaces of the recess 50. The elastic member 52 may be formed of rubber or a soft plastic material such as polyethylene, polypropylene, vinyl chloride or the like.

Figure 4:
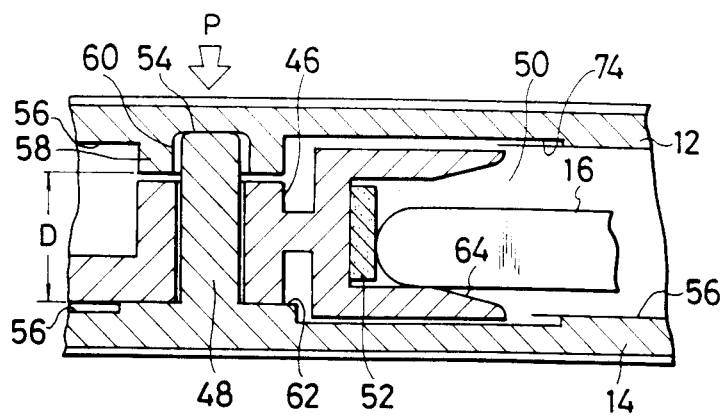
FIG. 4 is a fragmentary sectional view showing an essential part of a disc receiver.

Further, in the illustrated embodiment, as shown in FIG. 4, a gap D in the thickness direction of the casing 10 which has a dimension or distance sufficient to ensure smooth pivotal movement of the disc receiver 24 about the pivot pin 48 through the fitted portion is defined within the space between the upper and lower cover plates 12 and 14 of the casing 10 and around the pivot pin 48. The contact between an end surface 54 of the pivot pin 48 and an inner surface 56 of one of the upper and lower cover plates causes the above-described gap D to be formed in the width direction of the casing 10. In the illustrated embodiment, the pivot pin 48 is provided on the inner surface 56 of the lower cover plate 14 to upwardly project therefrom, and the gap D is formed due to the contact between an upper end surface 54 of the pivot pin 48 and the inner surface 56 of the upper cover plate 12. More particularly, the inner surface 56 of the upper cover plate 12 is provided with a bearing 58 which inwardly projects therefrom and is formed with a central hole 60 and the upper end 54 of the pivot pin 48 is loosely fitted in the hole 60 to define the gap D sufficient to carry out smooth movement of the fitted portion of the disc receiver 24 about the pivot pin 48. A lower end of the pivot pin may be integrally mounted on a base 62 provided on the inner surface of the lower cover plate 14. Thus, in the illustrated embodiment, it will be noted that the gap D is defined by a difference between a distance of the pivot pin 48 and a depth of the hole 60. In the embodiment, the pivot pin 48 and the bearing 58 are provided on the lower and upper cover plates 14 and 12, however, these may be provided the other way about.

Figure 6:
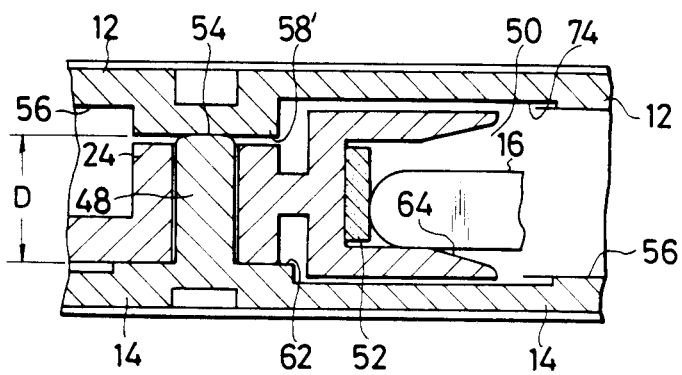
FIG. 6 is a fragmentary sectional view showing a modification of the disc receiver shown in FIG. 5.

FIG. 6 shows a modification of the embodiment. In the modification of FIG. 6, a bearing 58' free of any hole is substituted for the bearing 58 shown in FIG. 4 and an upper end surface 54 of a pivot pin 48 is engagedly abutted against a flat end surface of the bearing 58' to define a gap D. Accordingly, in the modification, it will be noted that a dimension of the gap D is determined by both a length of the pivot pin 48 and a height of the bearing 58'.

The recess 50 of the receiver body 46 is preferably formed in a manner such that its open end portion or inlet portion 64 is vertically enlarged so as to facilitate the insertion and removal of the disc 16 with respect to the recess 50.

Figure 5:
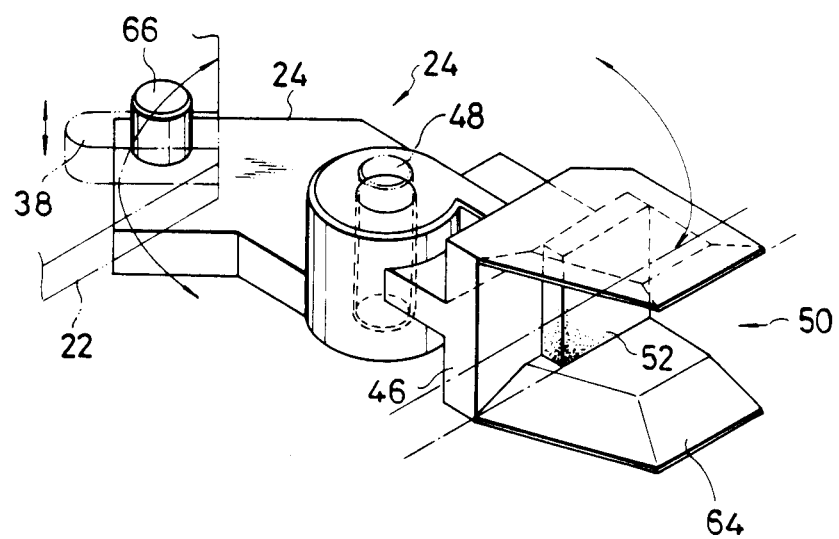
FIG. 5 is a perspective view showing a disc receiver.

The so-formed receiver body 46 is arranged to be positioned adjacent to the peripheral portion of the disc 16 to selectively receive a part of the peripheral portion in the recess 50 depending upon the sliding movement of the actuator 22 and also act as an elevator for lifting the disc 16. More particularly, the disc receiver 24, as best seen in FIG. 5, is also provided at the other end thereof with a guide pin 66 acting as operative connection means, which is loosely fitted in the guide groove 38 of the actuator 22 to operatively connect the disc receiver 24 to the actuator 22. In the illustrated embodiment, the guide pin 66 is provided at the disc receiver 24 and the guide groove 38 is formed at the actuator 22. However, the guide pin 66 and guide groove 38 may be provided at the actuator 22 and disc receiver 24, respectively.

Also, in the illustrated embodiment, the spring 42 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 7:
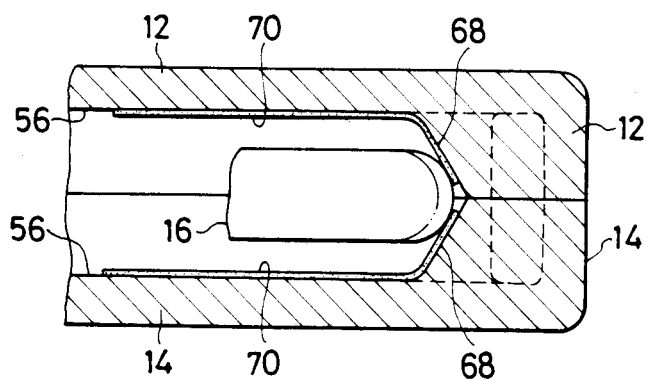
FIG. 7 is a sectional view taken along line VII—VII of FIG. 1.

Further, in the illustrated embodiment, the casing 10 is formed at a rear end 68 thereof into a substantially sideways V-shape as shown in FIG. 7, so that an inner end surface of the rear end 68 may be tapered. Such construction facilitates the positioning of the disc 16 at the center of the casing 10 in the thickness direction of the casing because it is guided along the tapered rear end 68. This results in the disc 16 being located at positions indicated at two-dot chain lines and solid lines in FIG. 7 when the disc cartridge is charged in a disc player and removed therefrom, respectively. Also, the tapered rear end 68 is applied thereto a disc holding member 70 to ensure safety and smooth operation of the disc in the casing 10. For this purpose, the disc holding member 70 is preferably formed of a material which is capable of exhibiting lubricating properties, such as ultra-high-molecular-weight polyethylene, ultra-high-molecular-weight polyethylene foam, graphite tetrafluoroethylene, polyethylene terephthalate (PET), metal sheet including stainless steel, and the like. Such a member likewise may be applied to the inner surface of the casing 10 adjacent to the tapered rear end as shown in FIG. 7.

The casing 10, as shown in FIG. 1, is formed on each of upper and lower surface sections of the inner surface thereof with a pair of recesses 74 so as to positionally correspond to the disc receivers 24. The recess 74 serves to ensure smooth pivotal movement of the disc receiver. Reference numerals 76 and 78 designate a bolt and a rib, respectively.

Now, the manner of operation of the disc cartridge of the illustrated embodiment constructed in the manner described above will be described hereinafter with reference to FIGS. 1 to 7.

When the disc cartridge is inserted in a disc player (not shown) for the operation, the actuating means or projection 32 of the actuator 22 projecting through the cutout 34 of each of the side plates of the casing 10 are engaged with a projection provided at an insertion port of the disc player to be rearwardly slided along the cutout 34 against the spring 42. The sliding of the projection 32 causes the shutter 20 to be released from the lock means or hook-like member 30, so that the shutter 20 may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 from the recess 50, resulting in the disc 16 being safely supported on the disc holding members 26 and then operatively engaged with a disc driving element of the disc player.

When the disc cartridge is to be removed from the disc player, the disc 16 is first disengaged from the disc driving element of the disc player to be put on the disc holding member 26 and then the shutter 20 is moved by means of the shutter actuating mechanism of the disc player to close the window 18. Then, the disc cartridge is removed from the disc player, so that the actuator 22 may be slided toward the front end of the disc cartridge by means of the spring 42 to actuate the disc receiver 24, to thereby fit a part of the disc 16 in the receiver body 46. This results in the disc 16 being forced toward the rear end of the casing 10 while being held at a state of floating in the space in the casing 10. Simultaneously, the lock means 30 of the actuator 22 actuate to keep the shutter 20 closed. Thus, the disc 16 is safely held in the casing 10, because the disc is housed in the manner that the outer periphery is constantly abutted against the end surface of the recess 50 of the receiver body 46 and the tapered rear end 68 of the casing 10.

Also, in the illustrated embodiment, the gap D of a predetermined distance is constantly formed by the pivot pin 48, so that smooth movement of the disc receiver 24 and shutter 20 may be ensured during the above-described operation even when any external force is applied to the disc cartridge.

As can be seen from the foregoing, the present invention is constructed in the manner that the gap is constantly formed in the space of the casing which has a distance sufficient to ensure smooth pivotal movement of the disc receiver for a long period of time with high reliability even when any external force is applied to the casing to distort or deform the casing. Also, such construction of the present invention ensures to safely keep the disc at a floating state in the casing without contacting it with the inner surface of the casing during transferring of the disc between the disc driving element of the disc player and the disc receiver.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge, comprising:
   a casing comprising an upper cover plate and a lower cover plate joined together to define a space in said casing;
   a disc rotatably housed in said casing; at least one window provided in said casing to allow insertion of a disc driving element therethrough into said casing;
   a shutter for operatively opening and closing said at least one window;
   a pair of actuators arranged in said casing and engaged with said shutter to releasably lock said shutter;
   a disc receiver arranged in said casing and operatively connected to at least one of said actuators to selectively receive therein a part of a peripheral portion of said disc;
   a pivot pin on which said disc receiver is supported so as to be pivotally movable about said pivot pin, said pivot pin being mounted on one of inner surface of said upper and lower plates of said casing opposite to each other to inwardly project therefrom;
   said pivot pin cooperating with the other of said inner surfaces to constantly form a gap in a thickness direction of said causing between said upper and lower plates which has a distance sufficient to ensure smooth movement of said disc receiver about said pivot pin;
   wherein said gap is formed due to the engagement between a distal end of said pivot pin and said other inner surface of said casing.

2. The cartridge of claim 1, additionally comprising a pair of disc receivers, each operatively connected to a respective actuator and each being supported on a respsective pivot pin,
   said pair of pivot pins being mounted on one of said inner surfaces of said upper and lower plates of said casing to inwardly project therefrom, and cooperating with the other of said inner surfaces to constantly form a gap in a thickness direction of said casing between said upper and lower plates which has a distance sufficient to ensure smooth movement of said respective disc receiver about said respective pivot pin.

3. A disc cartridge as defined in claim 1, wherein said the other inner surface of said casing is provided thereon with a bearing, said distal end of said pivot pin being engaged with said bearing.

4. A disc cartridge as defined in claim 3, wherein said pivot pin is mounted on a lower inner surface of said casing to inwardly project therefrom and said bearing is provided on an upper inner surface of said casing, said gap being formed by abuttedly engaging an upper end of said pivot pin with said bearing.

5. A disc cartridge as defined in claim 4, wherein said bearing is formed at a central portion thereof with a hole, said upper end of said pivot pin being loosely fitted in said hole of said bearing.

6. A disc cartridge as defined in claim 4, wherein said upper end of said pivot pin is abutted against an end surface of said bearing.

7. A disc cartridge as defined in claim 4, wherein pivot pin is mounted on said lower inner surface of said casing through a base.

8. The cartridge of claim 5, wherein said gap is substantially equal to difference between length of said pivot pin and depth of said hole.

9. The cartridge of claim 6, wherein said gap is substantially equal to difference between length of said pivot pin and height of said bearing.

10. The cartridge of claim 1, wherein said gap is substantially equal to length of said pivot pin.

11. The cartridge of claim 10, wherein said length of said pivot pin is greater than corresponding length of a portion of said disc receiver mounted about said pivot pin.

* * * * *